(12) United States Patent
Teramoto et al.

(10) Patent No.: US 7,533,495 B2
(45) Date of Patent: May 19, 2009

(54) GLASS RUN

(75) Inventors: Mitsunobu Teramoto, Aichi-ken (JP);
Hideaki Minoura, Aichi-ken (JP);
Hiroaki Nishikawa, Aichi-ken (JP)

(73) Assignee: Toyoda Gosei Co., Ltd.,
Nishikasugai-gun, Aichi-ken (JP)

( * ) Notice: Subject to any disclaimer, the term of this patent is extended or adjusted under 35 U.S.C. 154(b) by 144 days.

(21) Appl. No.: 11/657,023

(22) Filed: Jan. 24, 2007

(65) Prior Publication Data

US 2007/0175102 A1 Aug. 2, 2007

(30) Foreign Application Priority Data

Jan. 27, 2006 (JP) ............... P-2006-019455

(51) Int. Cl.
*E06B 7/16* (2006.01)
(52) U.S. Cl. ...................... 49/441; 49/479.1
(58) Field of Classification Search ........... 49/440, 49/441, 475.1, 479.1
See application file for complete search history.

(56) References Cited

U.S. PATENT DOCUMENTS

| | | | | |
|---|---|---|---|---|
| 4,864,774 | A * | 9/1989 | Onishi et al. | 49/440 |
| 4,894,953 | A * | 1/1990 | Nozaki | 49/440 |
| 5,636,895 | A * | 6/1997 | Ito et al. | 296/146.9 |
| 5,655,333 | A * | 8/1997 | Yamashita | 49/441 |
| 7,294,386 | B2 * | 11/2007 | Murase et al. | 428/99 |
| 2005/0053761 | A1 | 3/2005 | Murase et al. | |
| 2006/0107601 | A1 * | 5/2006 | Inagaki et al. | 49/441 |

FOREIGN PATENT DOCUMENTS

| | | |
|---|---|---|
| CN | 1590147 A | 3/2005 |
| JP | 8-216694 | 8/1996 |
| JP | 9-39579 | 2/1997 |
| JP | 9-300979 | 11/1997 |
| JP | 2000-103242 | 4/2000 |
| JP | 2003-118372 | 4/2003 |
| JP | 2000-158950 | 6/2003 |
| JP | 2005-96736 | 4/2005 |

OTHER PUBLICATIONS

Chinese Office Action dated Dec. 12, 2008 with English-Language Translation.

* cited by examiner

*Primary Examiner*—Jerry Redman
(74) *Attorney, Agent, or Firm*—McGinn IP Law Group, PLLC

(57) ABSTRACT

An insert member which is made of a material which is harder than a material forming a molded portion of a glass run which is mounted on an inner side of a sash is provided relative to a bottom portion of the molded portion. The insert member is provided with an insert body, and a projecting portion which is projects from the insert body toward the sash and is fitted in a hole in the sash so as to be locked in place therein. A part of an entire edge of a distal end portion of the projecting portion, which extends in a longitudinal direction of the molded portion is chamfered. In addition, a surface of the insert body facing the sash and at least a peripheral wall portion of the projecting portion are covered with a covering portion which is made of the material forming the molded portion.

8 Claims, 3 Drawing Sheets

GLASS RUN

BACKGROUND OF THE INVENTION

1. Field of the Invention

The present invention relates to a glass run.

2. Related Art

A glass run has a body part of a substantially U-shaped cross section which is provided with a bottom portion and a pair of side wall portions which extend from the bottom portion and a pair of seal lips which extend, respectively, from substantially distal ends of both the side wall portions into an inside of the body part. The glass run is mounted on an inner side of a sash provided along a glass opening formed in a door at the body part, whereby an interior side and an exterior side of a glass are sealed by the pair of seal lips, respectively.

In general, the glass run is divided into an extruded portion which extends in a longitudinal direction thereof and a molded portion which is provided in a corner portion thereof. Namely, the extruded portion is formed substantially in a straight line (in an elongated shape) by an extruder. In addition, the molded portion which corresponds to the corner portion of the glass run is molded in a predetermined molding unit in such a manner that for example, two extruded portions are connected to each other in such a state that a predetermined angle is formed therebetween.

Conventionally, as a material forming the glass run, ethylene-α-olefin non-conjugated diene copolymer (EPDM, hereinafter, simply referred to as "EPDM"), olefin based thermoplastic elastomer (TPO, hereinafter, simply referred to as "TPO") and the like are known.

Incidentally, there may occur a case where opening and closing stress of a glass is applied to an inclined side part of the glass run. As this occurs, it is feared that the glass run is, for example, moved to be dislocated (for example, in the case of a glass run for a front door glass, it is feared that the glass run is moved to be dislocated rearward.). As a technique for preventing the dislocation of the glass run in such a way, a technique is known in which a movement preventive projection is provided integrally on a corner portion or the like of the glass run. A projection like this is brought into abutment with an abutted portion on a sash, so as to realize a restriction on the movement of the glass run.

However, although there may be no problem under the normal temperature atmosphere, for example, a high temperature atmosphere of the order of 80° C., for example, the projection gets soft together with the body part of the glass run, resulting in a risk that the projection is broken or released from the abutment condition when the aforesaid stress is applied thereto.

In contrast to this, there has been proposed a technique in which a projection is made of a material which is harder than a material for a molded portion, so that the deformation, failure or the like of the projection is made difficult to occur even under a high temperature atmosphere, thereby making it possible to ensure the prevention of the movement of the glass run which is attributed to the stress generated when the glass is opened and closed. (Refer to, for example, JP-A-2005-96736.)

With the above technique, however, since the projection is made of the hard material, in the event that even a slight gap exists between the projection and the abutted portion on the sash in such a state that the glass run is mounted, there is caused a risk that an abnormal noise is produced due to the projection being brought into abutment with the abutted portion. In addition, in a case where a configuration is adopted in which the gap is eliminated in order to prevent the occurrence of the drawback mentioned above, there is caused a problem in mounting the glass run including the projection, resulting in a risk that the workability in mounting is deteriorated.

SUMMARY OF THE INVENTION

The invention was made in view of the situations, and an object thereof is to provide a glass run which is firstly made to prevent the movement and dislocation of the glass run which is attributed to stress generated when a glass is opened and closed and which can then not only prevent the generation of abnormal noise when restricting the movement and dislocation of the glass run but also realize an enhancement in workability in mounting.

Hereinafter, means suitable for attaining the object will be described while being itemized. Note that a function and advantage specific to each of the means will be added as required.

(1) First aspect of the invention provides a glass run having a body part of a substantially U-shaped cross section which is provided with a bottom portion and a pair of side wall portions which extend from the bottom portion and a pair of seal lips which extend, respectively, from substantially distal ends of both the side wall portions into an inside of the body part, the body part being mounted on an inner side of a sash provided along a glass opening formed in a vehicle body or a door, and a part corresponding to a corner portion being provided with a molded portion, wherein a hard member which is made of a material which is harder than a material forming the molded portion is provided for a bottom portion of the molded portion, wherein the hard member includes a plate-shaped insert body and a projecting portion which projects from the insert body toward the sash and is fitted and locked in a hole or a recess of the sash, wherein of an edge of a distal end portion of the projecting portion, a part which extends along a longitudinal direction of the molded portion is chamfered, and wherein a surface of the insert body facing the sash and at least a peripheral wall portion of the projecting portion are covered with a covering portion which is made of the material forming the molded portion.

According to the first aspect of the invention, the hard member is provided on at least the bottom portion of the molded portion of the glass run, and the projecting portion which projects from the insert body toward the sash is locked relative to the sash. Because of this, even though stress is applied to the glass run when the glass is opened and closed, the movement and dislocation of the glass run is restricted. In particular, since the hard member is made of the material which is harder than the material forming the molded portion, the restriction is assuredly implemented.

According to the first aspect of the invention, at least the peripheral wall portion of the projecting portion is covered with the covering portion which is made of the same material as the material forming the molded portion, that is, the material which is softer than the hard member. Because of this, when the movement and dislocation of the glass run is restricted, the projecting portion is brought into abutment with the sash via the covering portion, thereby eliminating a risk that the hard member made of the hard material is brought into direct abutment with the sash. Consequently, the generation of abnormal noise when the movement and dislocation of the glass run is restricted can be prevented.

In addition, of the circumferential portion of the distal portion of the projecting portion, the part which extends along the longitudinal direction of the molded portion is chamfered.

That is, the distal end portion of the projecting portion is narrowed in width. Because of this, when mounting the glass run, the projecting portion becomes easy to be fitted in the hole or recess of the sash. As a result, the workability in mounting the glass run can be enhanced.

Additionally, for example, when it is designed that a gap between the projecting portion which is covered with the covering portion and the sash is eliminated in such a state that the glass run is mounted properly, there may be caused a risk due to production errors or the like that the work of fitting the projecting portion in the hole or recess of the sash becomes difficult or impossible when the glass run is mounted. In this respect, according to this means, since the surface of the projecting portion is covered with the covering portion which is made of the material forming the molded portion, the covering portion can be deformed in such a manner as to follow the shape of the hole or recess of the sash when the projecting portion is fitted thereinto. Because of this, a slight production error can be permitted, thereby making it possible to suppress the drawback mentioned above.

In addition to this, of the circumferential portion of the distal portion of the projecting portion, only the part which extends along the longitudinal direction of the molded portion is chamfered, and a part of the projecting portion which is to be brought into abutment with the sash is not chamfered. Because of this, the projecting length of the part which is brought into abutment with the sash is secured, thereby making it possible to allow the projecting portion to be locked assuredly relative to the sash.

Note that the configuration described as reading "a surface of the insert body facing the sash and at least a peripheral wall portion of the projecting portion are covered with a covering portion which is made of the material forming the molded portion" may be modified as reading "at least a part of the hard member which is brought into abutment with the sash is covered with a covering portion which is made of the material forming the molded portion." In this case, too, a similar function and advantage provided by the first aspect of the invention are provided. In addition, the body part which is covered with the covering portion does not have to be in abutment with the sash at all times, and the body part may be brought into abutment with (be locked to) the sash after it has moved slightly. In addition to this, the whole surface of the projecting portion may be configured to be covered with the covering portion.

(2) In the second aspect of the invention, the hard member may be such that the insert body is embedded therein and the projecting portion is covered with the covering portion when the molded portion is molded.

According to the second aspect of the invention, since the insert body is embedded in the molded portion when the molded portion is molded, a labor hour can be saved which would otherwise be spent in mounting the hard member additionally. In addition, since the projecting portion is covered with the covering portion when the molded portion is molded, a labor hour can be saved which would otherwise be spent in joining the covering portion to the projecting portion additionally. Consequently, the deterioration of workability in production can be prevented.

(3) In the third aspect of the invention, the insert body may have a positioning recess which is formed on a surface thereof facing an inside of the glass opening, a molding unit for molding the molded portion may include at least a first mold piece for forming a surface of the molded portion facing the inside of the glass opening and a second mold piece for forming a surface of the molded portion facing the sash, a set pin may be projected from a molding surface of the first mold piece so as to be inserted into an inside of the positioning recess, and the molded portion may be molded such that the hard member is set in the molding unit with the positioning recess substantially fitted on the set pin.

According to the third aspect of the invention, when molding the molded portion, a positional deviation of the hard member relative to the molding unit and hence a positional deviation of the hard member relative to bottom portion of the molded portion can be prevented.

Note that when molding the molded portion, the hard member may be held and fixed in place by the molding surface of the first mold piece or the distal end portion of the set pin and a molding surface of the second mold piece or a presser pin projected from the molding surface. As this occurs, when molding the molded portion, the positional deviation of the hard member can be prevented more assuredly.

(4) In the fourth aspect of the invention, a stepped portion may be formed along an opening edge portion of the surface of the insert body facing the inside of the glass opening.

According to the fourth aspect of the invention, the stepped portion is formed at the opening edge-portion on a lower surface of the insert body, whereby at least the opening edge portion (the stepped portion) on the lower surface of the insert body is covered with the material forming the molded portion. Because of this, the embedded state of the insert body can be stabilized, thereby making it possible to suppress the occurrence of a risk that the hare member is separated from the molded portion.

(5) In the fifth aspect of the invention, the hard member may be provided on an inclined side part of the molded portion which corresponds to an inclined side of the sash.

Dislocating stress is easy to be generated at a part of the glass run which corresponds to the inclined side of the sash. Because of this, as in the fifth aspect of the invention, by providing the hard member at the inclined part of the molded portion, the function and advantage that the movement and dislocation of the glass can be restricted are assuredly provided.

(6) In the sixth aspect of the invention, the molded portion may be molded at an end portion of an extruded portion so as to be connected thereto, and an internal surface of a bottom portion of the extruded portion may lie radially further inward of the glass opening than an internal surface of the bottom portion of the molded portion.

For example, when the lower surface of the insert body is left exposed, the glass is brought into abutment with the lower surface of the insert body when the glass is closed, resulting in a risk that abnormal noise is produced. In this respect, according to the sixth aspect of the invention, since the internal surface (the surface facing the inside of the glass opening) of the bottom portion of the extruded portion is situated radially further inward of the glass opening than the internal surface (the surface facing the inside of the glass opening) of the bottom portion of the molded portion, the glass is firstly brought into abutment with the bottom portion of the extruded portion before it is brought into abutment with the bottom portion of the molded portion. Because of this, even though there occurs a case where the glass and the lower surface of the insert body are brought into abutment with each other, impact produced at the time of the abutment can be mitigated, and as a result, the generation of abnormal noise can be suppressed.

(7) In the seventh aspect of the invention, the covering portion may be substantially uniform in thickness at any parts thereof.

BRIEF DESCRIPTION OF THE DRAWINGS

FIG. 3 is a partial perspective view which shows the configuration of a molded portion and the like;

DETAILED DESCRIPTION OF THE PREFERRED EMBODIMENTS

Figure 1:
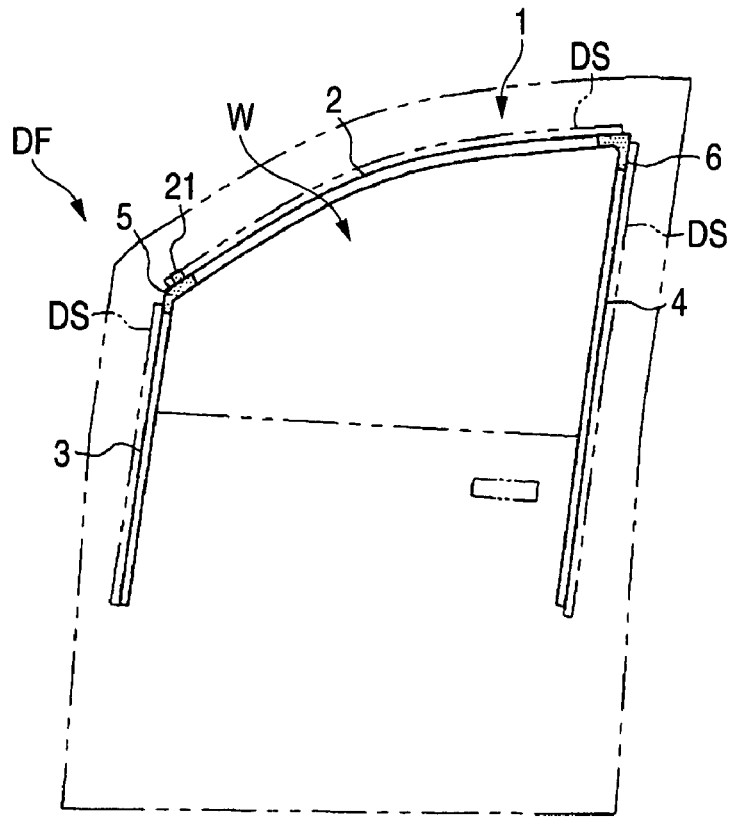
FIG. 1 is a front exemplary diagram which shows a schematic configuration of a door.
Figure 2:
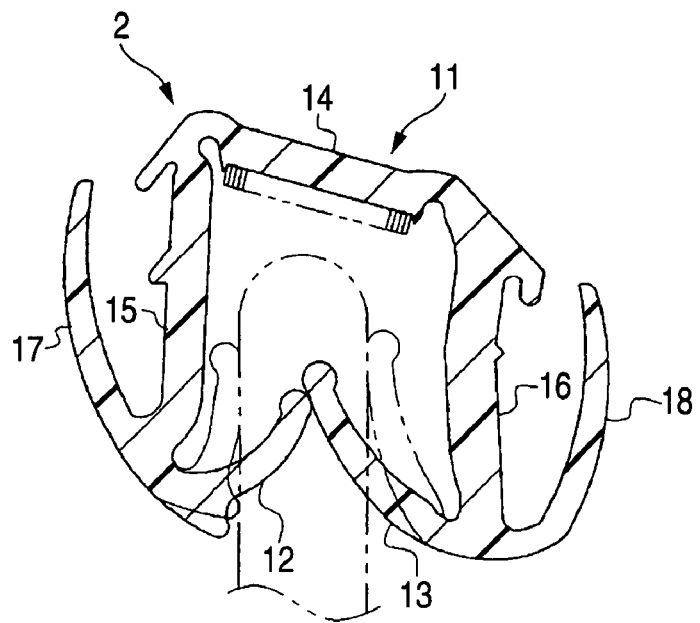
FIG. 2 is a sectional view which shows the configuration of a glass run.

Hereinafter, an embodiment of the invention will be described be reference to the drawings. FIG. 1 is a front exemplary view which schematically shows the configuration of a front door. FIG. 2 is a cross sectional view which shows the configuration of a glass run.

A glass run is mounted so as to surround an opening for a window glass in a vehicle door. To describe this more specifically, as is shown in FIG. 1, a sash DS is provided on a door DF so as to follow an outer peripheral shape of the door DF, and a glass opening W is defined which is opened and closed by a door glass which is allowed to move up and down by the sash DS. Then, a glass run 1 of this embodiment is mounted on an inner periphery of the sash DS.

The glass run 1 is divided into an extruded portion 2 which corresponds to an upper side section as viewed in a longitudinal direction thereof, extruded portions 3, 4 which correspond to front and rear vertical side sections and molded portions 5, 6 (portions which are shaded with scattered dots in FIG. 1) which connect end portions of the individual extruded portions 2, 3, 4 together. The individual extruded portions 2, 3, 4 are formed substantially in a linear shape (in an elongated shape) by an extruder (not shown). In addition, the molded portions 5, 6 are molded in a molding unit so as to interconnect the extruded portions 2 and 3 or 2 and 4 together in such a state that predetermined angles are formed between each pair of the extruded portions.

As is shown in FIG. 2, the extruded portion 2 includes a body part 11 and a pair of seal lips 12, 13. The body part 11 is provided with a bottom portion 14 which is fitted in (a retainer portion of) the sash DS and an exterior side wall portion 15 and an interior side wall portion 16 which extend from the bottom portion 14. In addition, the seal lips 12, 13 extend, respectively, from substantially distal ends of both the side wall portions 15, 16 into an inside (in a direction of the bottom portion 14) of the body part 11, whereby an exterior side and interior side of the door glass are sealed by the seal lips 12, 13, respectively. In addition, in this embodiment, an exterior design lip 17 which extends outward (to the outside of the vehicle) from the exterior side wall portion 15 and an interior design lip 18 which extends inward (to the inside of the vehicle) from the interior side wall portion 16 are formed.

Note that the extruded portions 3, 4 and the molded portions 5, 6 each also include a body part 11, a pair of seal lips 12, 13 and the like.

In this embodiment, the individual extruded portions 2, 3, 4 are made of TPO. On the other hand, the molded portions 5, 6 are also made of TPO. In addition, in this embodiment, a slight difference in elevation is formed in a radially inward direction of the glass opening between an internal surface of the bottom portion 14 of the extruded portion 2 and an internal surface of a bottom portion 14 of the molded portion 5. To describe this more specifically, the internal surface of the bottom portion 14 of the extruded portion 2 is made to lie radially further inward of the glass opening W than the internal surface of the bottom portion 14 of the molded portion 5.

Note that in this embodiment, a part (an inclined side) of the sash DS which corresponds to an upper edge portion of the glass opening W is inclined slightly upward toward the rear. Because of this, upper side portions of the extruded portion 2 and the molded portions 5, 6 which correspond to the inclined side are to be mounted in such a manner as to be inclined relative to a direction of opening and closing of the door glass.

Figure 3:
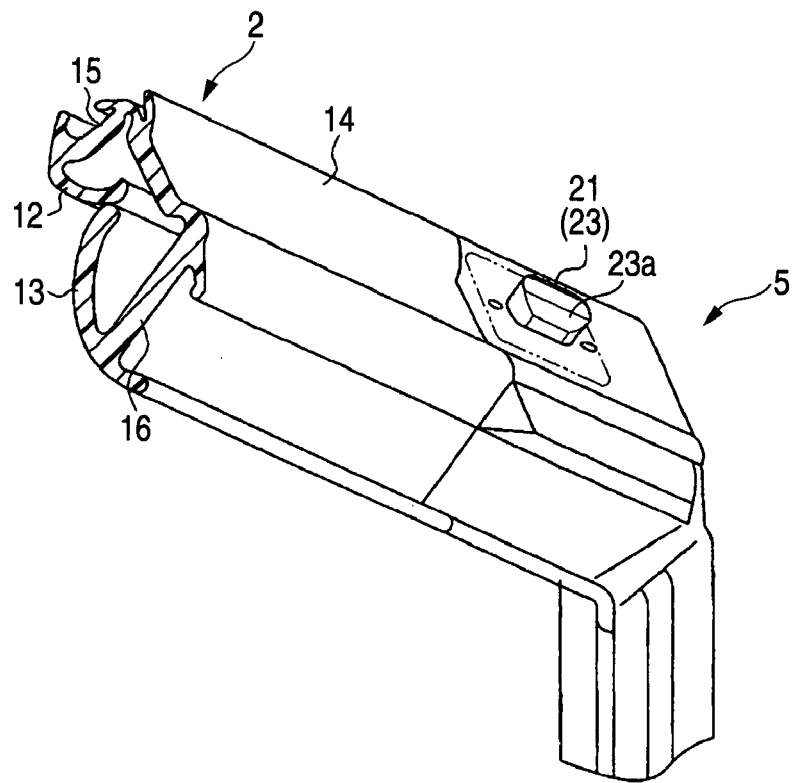
Figure 4:
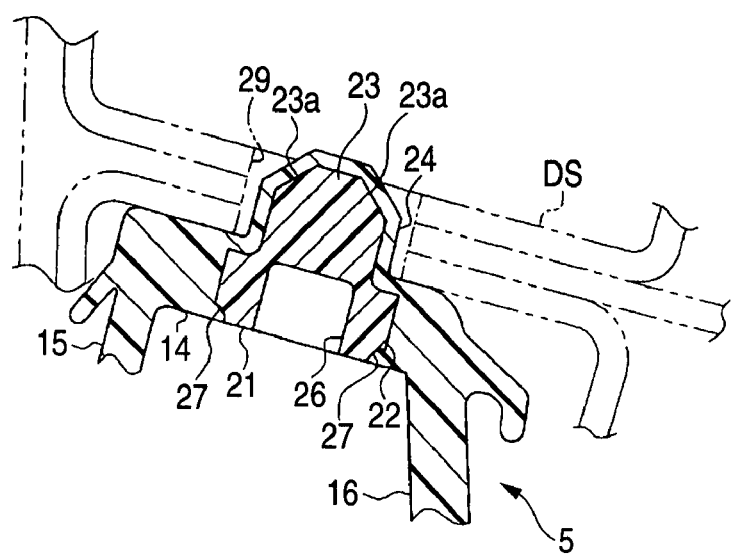
FIG. 4 is a sectional view which shows the configuration of an insert member.

Next, characteristic aspects of the embodiment will be described. FIG. 3 is a partial perspective view which shows the configuration of the molded portion and the like. FIG. 4 is a partial sectional view which shows a sectional configuration of the insert member in a direction which follows the longitudinal direction of the molded portion.

Although upward stress is applied to the glass run 1 when the glass is closed, since the upper side portions of the extruded portion 2 and the molded portions 5, 6 are inclined relative to the direction of opening and closing of the door glass, a rearward component of force is produced. Because of this, in order to prevent the glass run 1 from being moved to be dislocated, in this embodiment, as is shown in FIGS. 1 and 3 etc., an insert member 21 forming a hard member is provided in such a way as to correspond to the upper side portion, that is, the inclined side portion of the front molded portion 5.

As is shown in FIGS. 3 and 4 etc., the insert member 21 includes a plate-shaped insert body 22 which is embedded in the bottom portion 14 of the molded portion 5 and a projecting portion 23 which is formed integrally with the insert body 22 so as to project from the insert body 22 in a direction of the sash SD (in a fitting direction).

A section of the projecting portion 23 which results by cutting it in parallel with an external surface (a surface facing the sash DS) of the bottom portion 14 of the molded portion 5 becomes oval. However, a part of an edge of a distal end portion of the projecting portion 23 which extends along the longitudinal direction of the molded portion 5 is chamfered, whereby both sides of a distal end of the projecting portion 23 in the widthways direction present tapered surfaces (inclined surfaces) 23a.

In this embodiment, a surface of the projecting portion 23 is covered with TPO which is the same as the material forming the molded portion 5. The TPO which covers the surface of the projecting portion 23 (hereinafter, referred to as a covering portion 24) is substantially uniform in thickness at any parts thereof, and a superficial configuration of the covering portion 24 is substantially similar to an external configuration of the projecting portion 23. In addition, the covering portion 24 is formed integrally with the molded portion 5 when the molded portion 5 is molded.

A surface of the insert body 22 facing the sash DS (hereinafter, simply referred to as an upper surface) is covered with the same TPO as the material forming the molded portion 5, and this portion also constitutes the covering portion 24. In addition, the insert body 22 has a positioning recess 26 at substantially a center position of a surface thereof facing an inside of the glass opening W (hereinafter, simply referred to as a lower surface). Furthermore, a stepped portion 27 is formed on the lower surface of the insert body 22 along an opening edge portion thereof.

Although a detailed description will be made later on, in this embodiment, most of the lower surface of the insert body 22 is left exposed (refer to FIG. 6). However, the stepped portion 27 is covered with the material (TPO) forming the molded portion 5. In addition, the insert body 22 is embedded through so-called insert molding when the molded portion 5 is molded.

Then, with the glass run 1 mounted, the projecting portion 23, which is left projecting from the bottom portion 14, is locked relative to the sash DS such that the projecting portion 23 is fitted in a hole 29 of the sash DS which is indicated by chain double-dashed lines in FIG. 4. In this embodiment, the insert member 21 is made of polypropylene (PP) which is harder than TPO. To describe this more specifically, the hardness of TPO at normal temperatures has a hardness of 70 to 86 Shore A, whereas the hardness of PP at normal temperatures has a hardness of 60 Shore D.

Figure 5:
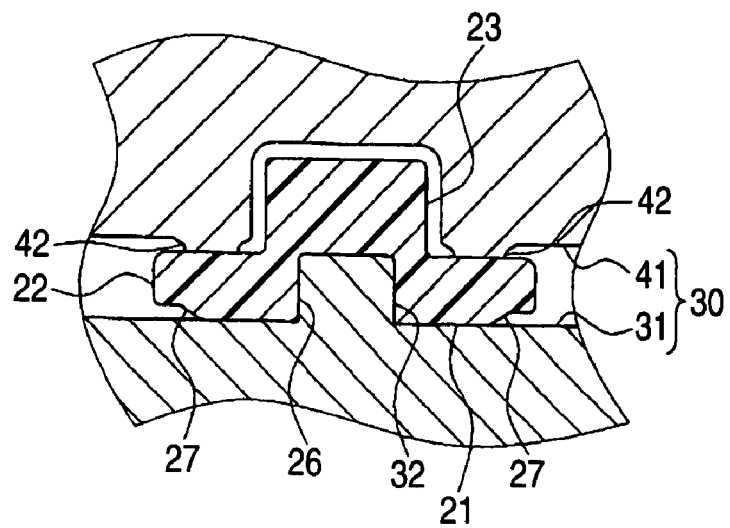
FIG. 5 is a partial sectional view which explains a molding unit and the insert member which is set in the molding unit.

Next, a molding unit for molding the molded portion 5 will be described by reference to FIG. 5. FIG. 5 is a partial sectional view which explains a molding unit which is used when molding the molded portion 5 and the insert member which is set in the molded unit. In FIG. 5, a section of the insert member is shown which results by being taken along a direction which intersects the longitudinal direction thereof at right angles.

As is shown in the same figure, a molded unit 30 includes a lower mold 31 which forms a first mold piece for molding a part of the molded portion 5 facing the inside of the glass opening W and an upper mold 41 which forms a second mold piece for molding a part of the molded portion 5 facing the sash DS. A set pin 32 is formed on a molding surface of the lower mold 31 in a position which corresponds to a position where the insert member 21 projects therefrom so as to be inserted into an inside of the positioning recess 26 of the insert body 22. In addition, a pair of presser pins 42 are formed on a molding surface of the upper mold 41 in positions which correspond to the position where the insert member 21 projects therefrom so as to be brought into abutment with the upper surface of the insert body 22.

Here, a method for manufacturing the glass run 1 which is configured as has been described above. Firstly, the extruded portions 2, 3, 4 are extruded by use of an extruder (not shown) while following a known extruding method.

Next, the molded portion 5 is molded in the following way. Namely, firstly, with the molding unit 30 opened, the insert member 21 is set in the molding unit 30 such that the set pin 32 which is formed on the molding surface of the lower mold 31 so as to project thereof is inserted into the positioning recess 26 (refer to FIG. 5). As this occurs, the positioning recess 26 is left substantially fitted on the set pin 32, and the lower surface of the insert body 22 is left in abutment with the molding surface of the lower mold 31.

Following this, end portions of: the extruded portions 2, 3 are fitted in both end portions of the molding unit 30 so as to be set in place therein, and the molding unit 30 is closed. As this occurs, as is shown in FIG. 5, distal end portions of the presser pins 42 which are projected from the molding surface of the upper mold 41 are brought into abutment with the upper surface of the insert body 22. Namely, when the molded portion 5 is being molded, the insert member 21 is held and fixed in place by the molding surface of the lower mold 31 and the presser pins 42. Note that a distance from the surface of the insert member 21 to the molding surface of the upper mold 41 is left constant at any locations therebetween.

Figure 6:
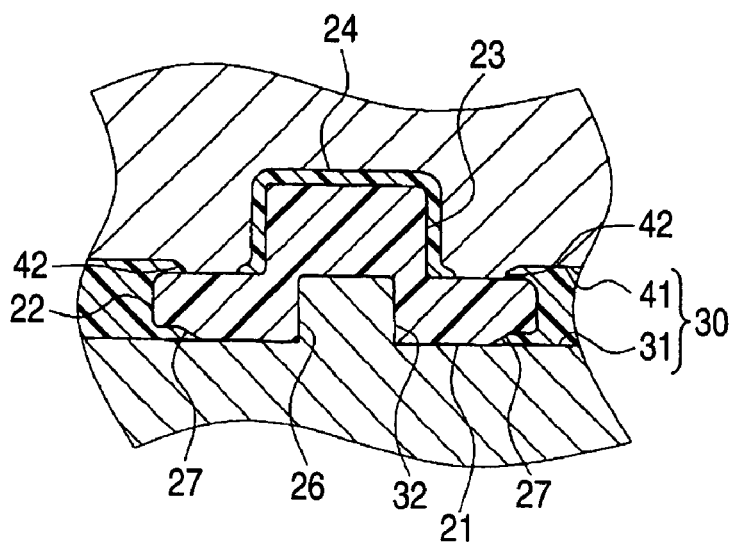
FIG. 6 is a partial sectional view which explains the molding unit and the insert member which is set in the molding unit.

Then, in this state, TPO, which is in a plastic state, is injected into a cavity in the molding unit 30 so as to fill the cavity as is shown in FIG. 6. After the completion of setting, the molding unit 30 is opened, and the molded portion 5 which has been so molded is then removed from the molding unit 30. In the way that has been described heretofore, the glass run 1 is manufactured. In addition, since the molded portion 5 is molded in the way described above, the lower surface (excluding the stepped portion 27) of the insert body 22 which is the part which was brought into abutment with the molding surface of the lower mold 31 and parts of the upper surface of the insert body 22 which were brought into abutment with the presser pins 42 are left exposed.

Next, a function and advantage of the embodiment that is configured as has been described heretofore will be described. In this embodiment, the insert member 21 is provided on the bottom portion 14 of the molded portion 5 of the glass run 1, and the projecting portion 23 which projects from the insert body 22 toward the sash DS is locked relative to the sash DS. Because of this, even though stress is applied to the glass run 1 when the glass is opened and closed, the movement and dislocation of the glass run 1 which is attributed to the stress so applied is restricted. In particular, in this embodiment, since the insert member 21 is made of the material (PP) which is harder than the material (TPO) forming the molded portion 5, the restriction is implemented more assuredly. In addition, even under a relatively high temperature atmosphere, since the insert member 21 is harder than the molded portion 5, the deformation, failure and the like of the insert member 21 are difficult to be brought about. Because of this, even under the high temperature atmosphere, the movement and dislocation of the glass run 1 which is attributed to the stress produced when the glass is opened and closed can be prevented in the more ensured fashion.

According to the embodiment, the surface of the projecting portion 23 is covered with the covering portion 24 which is made of the same material (TPO) as the material forming the molded portion 5, that is, the material which is softer than the insert member 21. Because of this, when the movement and dislocation of the glass run 1 is restricted, the projecting portion 23 is brought into abutment with the sash DS via the covering portion 24, whereby there occurs no case where the hard insert member 21 is brought into direct abutment with the sash DS. Consequently, the generation of abnormal noise can be prevented which would otherwise occur when the movement and dislocation of the glass run 1 is restricted.

In addition, the part of the edge of the distal end portion of the projecting portion 23 which extends along the longitudinal direction of the molded portion 5 is chamfered to form tapered surfaces 23a. Namely, the distal end portion of the projecting portion 23 is narrowed in width. Because of this, when mounting the glass run 1, the projecting portion 23 becomes easy to be fitted in the hole 29 of the sash DS. As a result, the workability in mounting the glass run 1 can be enhanced.

Furthermore, only the part of the edge of the distal portion of the projecting portion 23 which extends along the longitudinal direction of the molded portion 5 is chamfered, and a part of the projecting portion 23 which is to be brought into abutment with the sash DS is not chamfered. Because of this, the projecting length of the part which is brought into abutment with the sash DS is secured, thereby making it possible to allow the projecting portion 23 to be locked assuredly relative to the sash DS.

Additionally, for example, when it is designed that a gap between the projecting portion 23 which is covered with the covering portion 24 and the sash DS is eliminated in such a state that the glass run 1 is mounted properly, there may be caused a risk due to production errors or the like that the work of fitting the projecting portion 23 in the hole 29 of the sash DS becomes difficult or impossible when the glass run 1 is mounted. In this respect, according to this embodiment, since the surface of the projecting portion 23 is covered with the covering portion 24 which is made of the material forming the molded portion 5, the covering portion 24 can be deformed in such a manner as to follow the shape of the hole 29 the sash DS when the projecting portion 23 is fitted thereinto. Because of this, a slight production error can be permitted, thereby making it possible to suppress the drawback mentioned above.

In addition to this, since the insert body 22 is embedded in the molded portion 5 when the molded portion 5 is molded, a labor hour can be saved which would otherwise be spent in mounting the insert member additionally. In addition, since the projecting portion 23 is covered with the covering portion 24 when the molded portion 5 is molded, a labor hour can be saved which would otherwise be spent in joining the covering portion 24 to the projecting portion 23 additionally. Consequently, the deterioration of workability in production can be prevented.

Additionally, the positioning recess 26 is formed on the lower surface of the insert body 22, and when molding the molded portion 5, the insert member 21 can be set in the molding unit 30 in such a state that the positioning recess 26 is substantially fitted on the set pin 32 on the lower mold 31. Furthermore, when molding the molded portion, the insert member 21 is held and fixed in place by the molding surface of the lower mold 31 and the presser pins which are projected from the molding surface of the upper mold 41. Consequently, when molding the molded portion 5, the movement and dislocation of the insert member 21 relative to the molding unit 31 and hence the movement and dislocation of the insert member 21 relative to the molded portion 5 can be prevented.

Furthermore, the stepped portion 27 is formed along the opening edge portion on the lower surface of the insert body 22, whereby the opening edge portion (the stepped portion 27) on the lower surface of the insert body 22 is allowed to be covered with the material (TPO) forming the molded portion 5. Because of this, the embedded state of the insert body 22 can be stabilized, thereby making it possible to suppress the occurrence of a risk that the insert member 21 is separated from the molded portion 5.

In addition, in the embodiment, the internal surface of the bottom portion 14 of the extruded portion 2 lies radially further inward of the glass opening W than the internal surface of the bottom portion 14 of the molded portion 5. Because of this, the glass is brought into abutment with the bottom portion 14 of the extruded portion 2 before it is brought into abutment with the bottom portion 14 of the molded portion 5. Because of this, even in the event that the glass is brought into abutment with the lower surface of the insert body 22 which is left exposed when the glass is closed, impact generated at the time of the abutment can be mitigated, and as a result, the generation of abnormal noise can be suppressed.

In addition to this, in the embodiment, since the insert member 21 is made of the material which is compatible with the molded portion 5, a case is made difficult to occur in which the insert member 21 is separated from or comes off the molded portion 5. In addition, a strong mounted state (embedded state) can be maintained without opening a hole in the insert body 22 so as to form the molded portion. In order to secure a stronger embedded state, however, a hole may be opened in the insert body 22.

Note that the invention is not limited to what has been described with respect to the embodiment, and hence, the invention may be carried out in the following ways. Of course, applications and modified examples which will not be described below can also be contained in the scope of the invention.

(a) While in the embodiment, the insert member 21 is described as being provided on the upper side portion of the front molded portion 5, for example, the insert member 21 may be provided on a vertical side portion of the rear molded portion 6. Alternatively, the insert member 21 may be provided at two locations such as on the upper side portion and the vertical side portion of the molded portions 5, 6, respectively. Furthermore, the insert member may be provided integrally in an L-shape. In addition, while in the embodiment, the molded portion 5 of the front side door is described in detail, an insert member 21 having a projecting portion 23 may similarly be provided on a molded portion (for example, a rear molded portion) or the like of a rear side door.

(b) While in the embodiment, the surface (the whole surface) of the projecting portion 23 is described as being covered with the covering portion 24, the invention is not limited particularly to the configuration like this, and hence, the part which is brought into abutment with the sash DS may be covered with the covering portion 24 which is made of the material forming the molded portion 5. As an example of such an aspect, a configuration can be raised in which the upper surface of the insert body 22 and a peripheral wall portion of the projecting portion 23 are covered with the covering portion 24. Even in this case, a similar function and advantage to those described above are provided.

(c) There is imposed no specific limitation on the shape of the projecting portion 23 in the embodiment. However, the shape is maintained in which the part of the edge of the distal end portion of the projecting portion 23 which extends along the longitudinal direction of the molded portion 5 is chamfered. In addition, while in the embodiment, the configuration is adopted in which the projecting portion 23 is locked by being fitted in the hole 29 formed on the sash DS, for example, a configuration may be adopted in which a recess is formed in advance on the sash DS, so that the projecting portion 23 is locked by being fitted in the recess.

(d) While in the embodiment, the extruded portions 2, 3, 4 are made of TPO, they may be made of other materials such as EPDM. This is true with the insert member (consequently, as the insert member, other olefin based polymers may be adopted which include a high-density polyethylene, or other resin materials may be adopted which include polyamide, or metallic materials may be adopted. In short, the insert member only has to be made of a material which is harder than the molded portion.

(e) While in the embodiment, the invention is embodied as the glass run 1 having provided thereon both the exterior design seal lip 17 and the interior design seal lip 18, the invention can be applied to an application in which at least one of the lips is omitted.

(f) A groove may be formed in the extruded portion, so that the insert member (the hard member) is fitted in the groove, and a covering layer which is made of the material forming the molded portion may be provided on the insert member so fitted. In short, the insert member (the hard member) does not have to be limited on only the molded portion but may partially be caused to extend over the extruded portion.

What is claimed is:

1. A glass run comprising:
 a body part of a molded portion having a substantially U-shaped cross section provided with a bottom portion and a pair of side wall portions extending from the bottom portion; and
 a pair of seal lips extending from substantially distal ends of the side wall portions into an inside of the body part,
 wherein the body part is adapted to be mounted on an inner side of a sash surrounding an opening which is formed in a vehicle body or in a door such that the molded portion is located in a corner of the sash, and
 wherein a hard member which is made of a material which is harder than a material forming the molded portion is provided for a bottom portion of the molded portion, the hard member includes a plate-shaped insert body and a projecting portion projecting from the insert body toward the sash and so as to be fitted to the sash,
 a part of an edge of a distal end portion of the projecting portion which extends along a longitudinal direction of the molded portion is chamfered, and
 a surface of the insert body facing the sash and at least a peripheral wall portion of the projecting portion are covered with a covering portion which is made of the material forming the molded portion.

2. The glass run according to claim 1, wherein the insert body of the hard member is embedded in the body part of the molded portion and the projecting portion is covered with the covering portion, when the molded portion is molded.

3. The glass run according to claim 1, wherein the insert body includes a positioning recess which is formed on a surface thereof facing an inside of the opening,
 a molding unit for molding the molded portion includes at least a first mold piece for forming a surface of the molded portion facing the inside of the opening and a second mold piece for forming a surface of the molded portion facing the sash,
 a set pin is projected from a molding surface of the first mold piece so as to be inserted into an inside of the positioning recess, and
 the molded portion is molded such that the hard member is set in the molding unit with the positioning recess substantially fitted on the set pin.

4. The glass run according to claim 3, wherein a stepped portion is formed along an opening edge portion of the surface of the insert body facing the inside of the opening.

5. The glass run according to claim 1, wherein the hard member is provided on an inclined side part of the molded portion which corresponds to an inclined side of the sash.

6. The glass run according to claim 1, wherein the molded portion is molded at an end portion of an extruded portion so that the molded portion and the extruded portion are connected to each other, and
 an internal surface of a bottom portion of the extruded portion lies radially further inward of the glass opening than an internal surface of the bottom portion of the molded portion.

7. The glass run according to claim 1, wherein an entirety of the covering portion which covers the hard member including an upper surface of the insert body and the projecting portion, has a uniform thickness.

8. A glass run comprising:
 a body part of a molded portion having a substantially U-shaped cross section provided with a bottom portion and a pair of side wall portions extending from the bottom portion; and
 a pair of seal lips extending from substantially distal ends of the side wall portions into an inside of the body part,
 wherein the body part is adapted to be mounted on an inner side of a sash surrounding an opening which is formed in a vehicle body or in a door such that the molded portion is located in a corner of the sash, and
 wherein a hard member which is made of a material which is harder than a material forming the molded portion is provided for a bottom portion of the molded portion, the hard member includes an insert body having a positioning recess which is formed on a surface thereof facing an inside of the opening and a projecting portion projecting from the insert body toward the sash and so as to be fitted to the sash,
 a part of an edge of a distal end portion of the projecting portion which extends along a longitudinal direction of the molded portion is chamfered, and
 a surface of the insert body facing the sash and at least a peripheral wall portion of the projecting portion are covered with a covering portion which is made of the material forming the molded portion.

* * * * *